United States Patent [19]
Baker et al.

[11] Patent Number: 5,627,744
[45] Date of Patent: May 6, 1997

[54] CONVERTER ENHANCED VARIABLE FREQUENCY POWER BUS ARCHITECTURE

[75] Inventors: Roy S. Baker; Paul E. Nuechterlein, both of Rockford, Ill.

[73] Assignee: Sundstrand Corporation, Rockford, Ill.

[21] Appl. No.: 603,291

[22] Filed: Feb. 2, 1996

[51] Int. Cl.$^6$ .............................. H02M 5/04; H02P 5/28
[52] U.S. Cl. ........................... 363/165; 322/32; 318/807
[58] Field of Search ........................... 363/159, 160, 363/161, 162, 163, 165; 322/29, 32; 318/801, 807

[56] References Cited

U.S. PATENT DOCUMENTS

| | | | |
|---|---|---|---|
| 3,571,693 | 3/1971 | Raiz et al. | 322/32 |
| 4,352,155 | 9/1982 | Gyugyi | 363/163 |
| 4,870,339 | 9/1989 | Furukawa et al. | 322/29 |
| 4,905,134 | 2/1990 | Recker et al. | 363/98 |
| 5,402,054 | 3/1995 | Eckersley | 318/801 |

*Primary Examiner*—Peter S. Wong
*Assistant Examiner*—Adolf Berhane
*Attorney, Agent, or Firm*—Jeffery J. Makeever

[57] ABSTRACT

An electric power generation and distribution system having a basic variable frequency distribution bus to which wide frequency variation tolerant utilization equipment is coupled and an enhanced frequency distribution bus to which wide frequency variation intolerant utilization equipment is coupled, comprises a variable speed generator driven by an external variable speed prime mover such as an aircraft engine. This generator produces output electric power having a frequency which varies with the speed at which the generator is driven. The system further comprises a converter which is electrically coupled to the generator and produces output electric power having a controlled frequency. A switching network operates to couple the generator to and decouple the converter from this enhanced bus when the frequency of the electric power produced by the generator is within a predetermined acceptable range to allow the generator to supply power thereto. The switching network also operates to decouple the generator from and couple the converter to the enhanced bus when the frequency of the electric power produced by the generator is outside this predetermined acceptable range. The converter then supplies the electric power requirements of the enhanced bus, ensuring that the utilization equipment coupled thereto is not exposed to electric power having a frequency outside an acceptable range. The converter may be operated to match the generator output waveform prior to transfer to allow a no break power transfer between the two sources.

20 Claims, 3 Drawing Sheets

CONVERTER ENHANCED VARIABLE FREQUENCY POWER BUS ARCHITECTURE

FIELD OF THE INVENTION

This invention relates to electric power generation, conversion, and distribution, and more particularly to a variable frequency electric power system utilizing electronic power conversion to enhance system reliability.

BACKGROUND ART

Typical aircraft electrical power generation and distribution systems produce and distribute electric power having a constant frequency. These typical systems utilize either a constant speed drive to convert the variable speed of the aircraft engine to a constant speed to drive a generator, or allow the generator to be driven by the engine and convert the variable Frequency output to a constant frequency by an electronic converter. In an effort to reduce overall system cost and weight, several airframe manufacturers are considering the use of variable frequency electric power generation systems to supply all of the electric power required by their aircraft, thereby eliminating the need for a constant speed drive or fully rated electronic converter.

Such variable frequency systems typically comprise variable speed generators driven directly by each of the aircraft's engines. The output power produced by such generators have a frequency which is dependant on the speed of the engine. During the normal cruise flight phase, the output frequency of the generator will be within a fairly narrow band because the engines are at a fairly constant speed. During takeoff, landing, and ground operation, however, the output frequency of the generators will typically vary over a wide band because of the variation in engine speed during these flight phases. While many of the electrical loads will not be adversely affected by such wide variation in frequency, still other more sensitive electrical loads will not tolerate such a wide frequency variation.

To solve the problem of wide frequency variation intolerance by sensitive loads, typical variable frequency generation and distribution systems have included an electronic converter sized and connected to accommodate only the sensitive loads. This converter takes the variable frequency output of the generator, converts this output to a constant frequency, and supplies the constant frequency power to the sensitive loads on their own dedicated load bus. This converter is smaller than a converter rated to supply all of the aircraft loads, and therefore provides advantages over such a system. However, since this dedicated converter is operated during all flight phases, its switching losses reduce the efficiency, and therefore drive up the cost, of the system.

It is an objective of the instant invention to provide a variable frequency electric power generation and distribution system which solves these and other problems in the art. Specifically, it is an objective to provide a variable frequency electric power system which allows the variable frequency generator to provide electrical output to all of the connected loads while its output is within a defined power quality. It is a further objective to provide a system which ensures that sensitive loads continue to receive electric power during all flight phases, and that they do not receive electric power outside the defined power quality during any flight phase. Further, it is an objective of the instant invention to increase efficiency and reduce operating costs of a variable frequency electric power generation and distribution system.

SUMMARY OF THE INVENTION

In a preferred embodiment of the instant invention, a variable frequency electric power generation and distribution system for supplying electric power to at least one load distribution bus comprises a variable speed generator having a mechanical input driveably coupled to an external prime mover, and an electrical output. The generator produces electric power having a frequency which is related to the speed at which it is being driven by the external prime mover. This electrical output is coupled to the distribution bus to supply the electrical loads (utilization equipment) connected thereto. This embodiment of the instant invention further comprises an electronic converter for convening the frequency of the generator's electric power to a controlled frequency. A switching network is also included for controllably decoupling the generator from the distribution bus when its frequency deviates from a predetermined acceptable range. This switching network thereafter allows the converter to supply its controlled frequency electric power to the distribution bus.

In a highly preferred embodiment, a second distribution bus is included. This distribution bus may be used to supply utilization equipment whose input power requirements allow for wide frequency variations. In this embodiment, this second distribution bus is permanently coupled to the generator, i.e. is unaffected by the switching of the first distribution bus to the converter. Normal redistribution control, power quality, and protective functions may still operate to disconnect the distribution bus from the generator.

In a preferred embodiment of the instant invention, the converter is connected to the generator output and to the first distribution bus, and the switching network simply disconnects or interrupts the generator's connection to this bus. In this embodiment, the converter senses the generator output and operates its switches to mirror the sensed waveform. The converter also monitors its output current and adjusts its switching to ensure that it produces approximately zero net power to the bus when the generator is connected thereto. When the switching network disconnects the generator from the bus, however, the converter then supplies its power requirements. In this way, a continuous supply of power is ensured to this bus.

In alternate preferred embodiments, the switching network may alternatively couple the generator output between the first distribution bus and the input to the converter, or may alternatively couple the first distribution bus between the generator output and the converter output. In each of the embodiments, the switching and converter control may be accomplished in such a manner to ensure no break in power to the distribution bus, or may allow full isolation between converter output and generator by ensuring a break in power.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
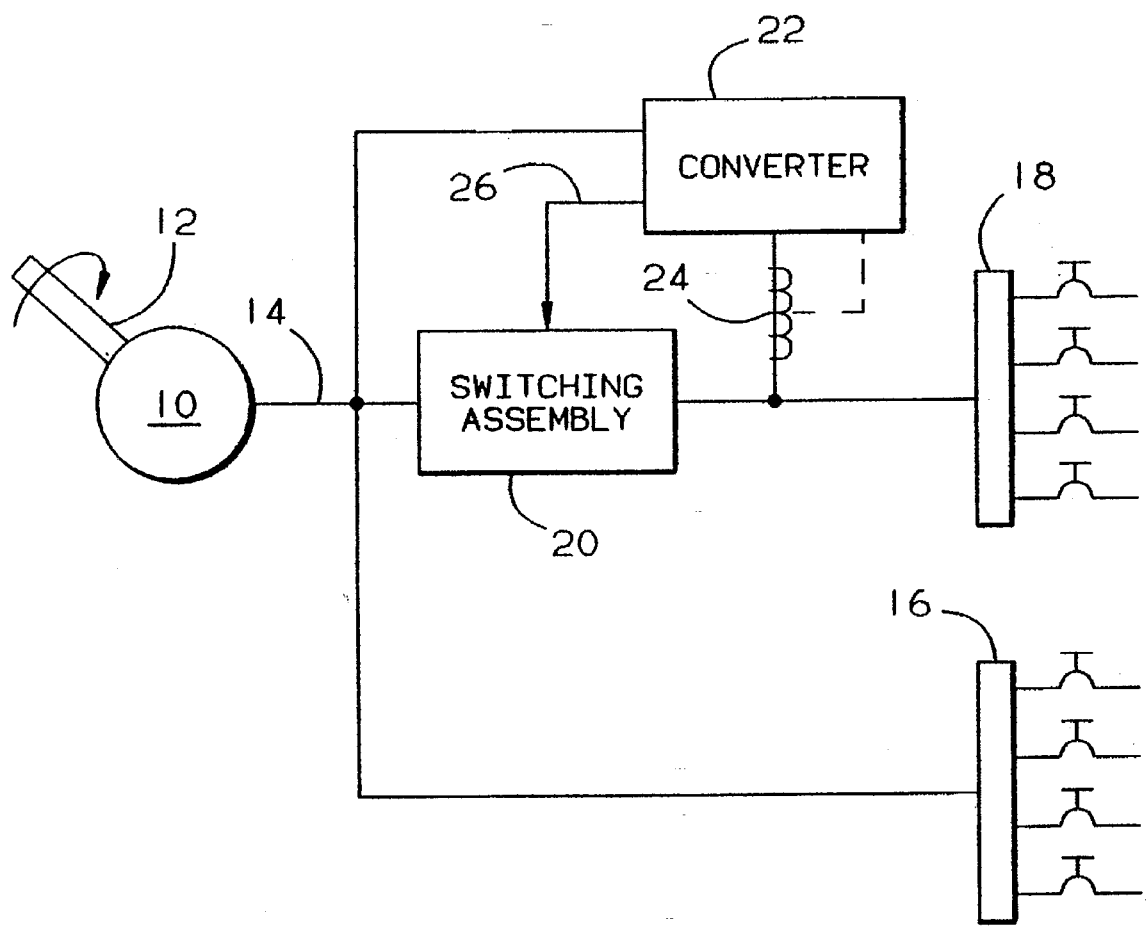
FIG. 1 is a single-line diagram illustrating an embodiment of the instant invention.

In a preferred embodiment of the instant invention as illustrated in FIG. 1, a variable speed generator 10 is coupled by shaft 12 to an external prime mover, such as an aircraft engine (not shown). As the aircraft is operated over its various flight phases and modes of operation, the engine speed is varied to accord the aircraft the thrust required. Since the generator 10 is driven directly from the engine, i.e. driven without speed controlling gearing such as a constant speed drive, it is rotated at speeds which vary in direct proportion to the speed of the engine. As a result of this variable speed operation of the generator 10, the electrical output generated has a variable frequency which is, as stated above, dependant upon the speed of the engine.

This variable frequency electrical output is coupled by feeders 14 to a basic variable frequency distribution bus 16. Utilization equipment capable of accepting this variable frequency power is coupled to and receives power from this basic bus 16. Over the entire flight profile the frequency variation from the generator 10 may be as great as 2:1 or larger depending on the speed variations allowable by the engine. During a long portion of the flight profile, however, the speed of the engines are within a relatively narrow band and, consequently, the output frequency of the generator 10 is also within a relatively narrow band. While the aircraft is operating in this phase of flight, during cruse for example, the generator 10 may also be coupled to an enhanced variable frequency bus 18 to which utilization equipment which cannot accept wide frequency variations is coupled. During this phase of operation, the generator 10 is supplying the entire aircraft electrical load directly because its output is within power quality limits for all equipment.

As the aircraft engines are either increased or decreased in speed, however, the frequency of the electrical output deviates from the output power quality which is acceptable to all equipment on the aircraft. Once this condition is sensed, a means, such as switching network 20, controllably decouples the generator from the enhanced bus 18. This switching assembly may comprise a mechanical contactor such as is used to control power source switching in typical aircraft electrical power distribution systems, or may be constructed from solid state devices such as thyristors, MOS-controlled thyristors (MCTs), silicon controlled rectifiers (SCRs), etc. to allow bi-directional current flow as is known in the art. By opening the switching assembly 20, the utilization equipment which cannot tolerate wide frequency variations on its input power are protected from damage.

However, since it is desirable to maintain power to these loads, a preferred embodiment of the instant invention couples the output of the generator 10 to means 22 for converting the variable frequency output of the generator 10 to a controlled frequency. This power conversion means 22 may be a cycloconverter, a dc link converter, etc. as are conventional and known in the art. In a preferred embodiment, the converter 22 is operated at all times that the generator 10 is operated to produce power. The input waveform from the generator 10 is sensed and used by the converter 22 to control the output voltage waveform of the converter 22 during operation while the generator 10 is directly supplying power to the enhanced bus 18. This control also senses the output current waveform (by current sensing means 24) of the converter and controls the switching of its power semiconductors to ensure that the converter supplies essentially zero power to the enhanced bus. As soon as the generator is taken off the enhanced bus by the switching network 20, however, the converter 22 supplies all of the electrical power requirements to the enhanced bus.

Since the converter 22 produces a controlled frequency output and since the converter 22 is operating prior to tripping the generator off the enhanced bus 18, the utilization equipment coupled thereto experience no loss or break in power. The efficiency of the overall system is increased as well because, although the converter 22 is operating at all times, it is not supplying substantially any electrical power to the loads so long as the generator output is within acceptable parameters. Without supplying any power, the converter switching losses are minimal at most which also reduces the cooling requirements. In a preferred embodiment, the converter 22 supplies the control signal 26 to the switching network 20 to couple and decouple the generator 10 to and from the enhanced bus, although such control may be provided by an external controller as desired without affecting the scope of the invention.

Figure 2:
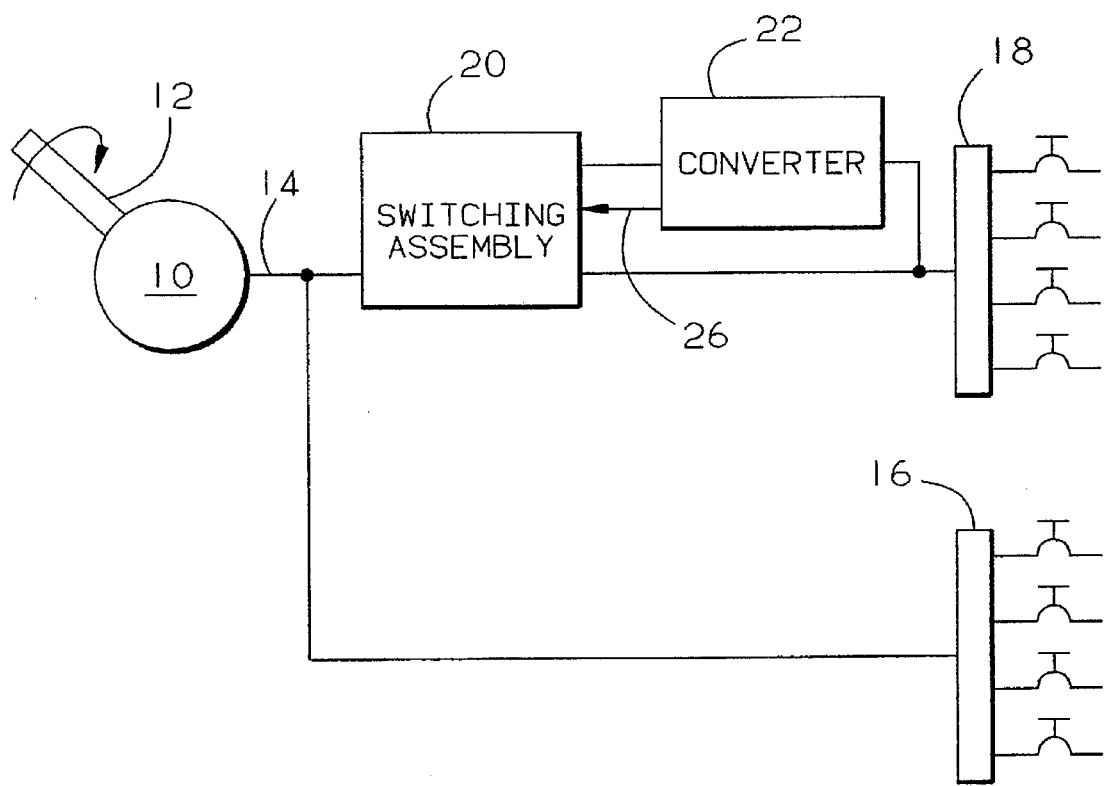
FIG. 2 is a single-line diagram illustrating an alternate embodiment of the instant invention.

In an alternate preferred embodiment of the instant invention as illustrated in FIG. 2, the switching assembly 20 is interposed to switch the generator output from the enhanced bus 18 to the converter 22. While this configuration results in a short break in power during the transition from the generator 10 to the converter 22 and from the converter 22 to the generator 10, the system efficiency is increased further because the converter 22 is not operated until it is required to supply power to the enhanced bus 18 once the generator is no longer connected to this bus. Alternatively, the switching assembly 20 of this embodiment may employ a make-before-break configuration as is known in the art which will allow a no-break power transfer from the generator 10 to the converter 22 and vise versa.

Figure 3:
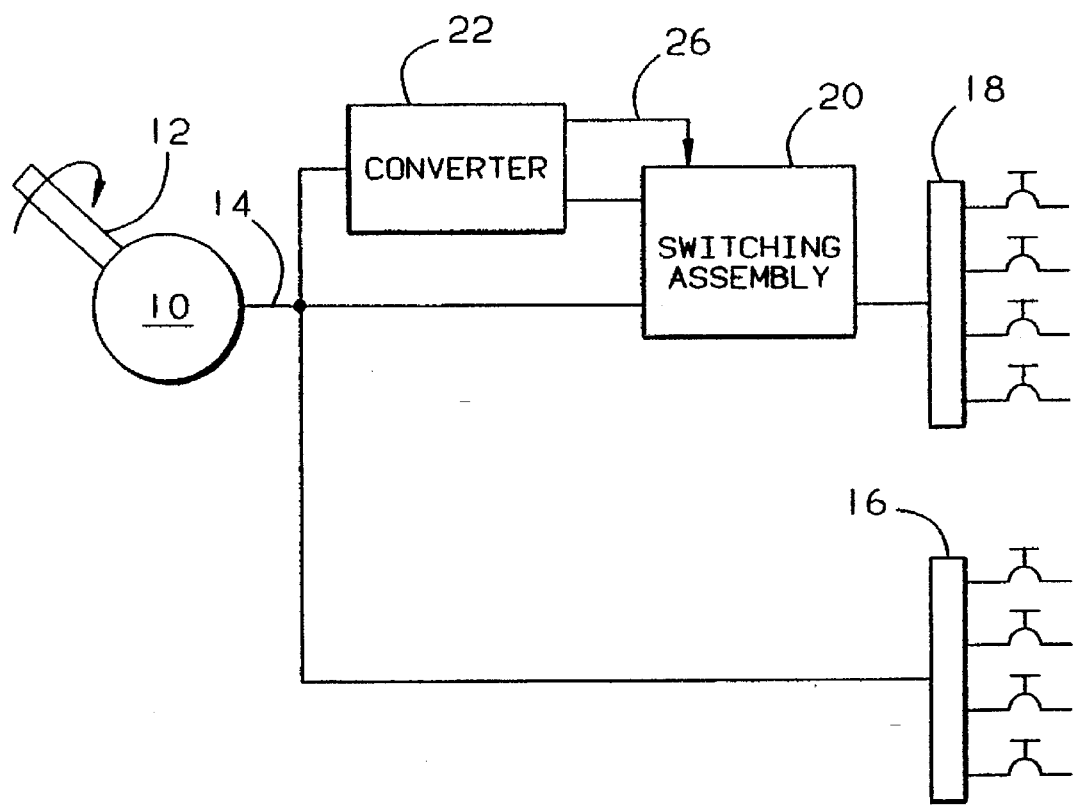
FIG. 3 is a single-line diagram illustrating an alternate embodiment of the instant invention.

An alternate preferred embodiment of the instant invention as illustrated in FIG. 3 utilizes a switching assembly 20 interposed to switch the coupling to the enhanced bus 18 from the generator 10 to the converter 22. As with the configuration of FIG. 2, increased system efficiency may be realized by not operating the converter 22 until the generator output parameters are sensed as deviating from an acceptable range. Once such a situation is sensed, the converter may begin operation and, as soon as its output power is available, command the switching assembly 20 to transition from the generator 10 to the converter 22. This transition may be by break or no-break power transfer as desired. When the generator output is within an acceptable range, the switching assembly 20 is commanded to transition back to the generator. After which, the converter may again be shut down to increase efficiency of the system.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved. While only single line diagrams were utilized in the description of the preferred embodiments, it will be understood by those skilled in the art that such a system may comprise a plurality of phases. Likewise, while only one channel of power generation was illustrated, one skilled in the art will understand that the scope of the invention applies equally well to a multi-channel electric power generation and distribution system having a plurality of generators coupled to a plurality of engines on the aircraft. These generators may be switchably coupled to a single converter supplying a single enhanced bus, or may be switchably coupled to a plurality of converters supplying a plurality of enhanced buses as will be apparent to those skilled in the art in view of the foregoing description and the appended claimed.

We claim:

1. A variable frequency electric power generation and distribution system for supplying electric power to at least one load distribution bus, comprising:

a variable speed generator having a mechanical input driveably coupled to an external prime mover and an electrical output, said generator producing electric power on said output having a frequency related to a speed at which said generator is driven by said external prime mover, said electrical output being coupled to the distribution bus;

first means for converting said frequency of said electric power to a controlled frequency; and second means for controllably decoupling said generator from the distribution bus when said frequency of said generator deviates from a predetermined acceptable range, said second means thereafter allowing said first means to supply said controlled frequency electric power to the distribution bus.

2. The system of claim 1, wherein the system has at least two distribution buses, at least one of which is permanently connected to said generator.

3. The system of claim 1, wherein said first means comprises an electronic power converter having an input coupled to said generator's electrical output, and an output coupled to the distribution bus, and wherein said second means is interposed between said generator's electrical output and the distribution bus.

4. The system of claim 3, wherein the system has at least two distribution buses, at least one of which is permanently connected to said generator.

5. The system of claim 3, wherein said converter operates during a period when said generator is coupled to the distribution bus to supply and receive approximately zero net power to and from the distribution bus during said period.

6. The system of claim 3, wherein said second means operates to ensure continuous power supply to the distribution bus.

7. The system of claim 1, wherein said first means comprises an electronic power converter having an input, and an output coupled to the distribution bus, and wherein said second means is interposed between said generator's electrical output and the distribution bus and between said generator's electrical output and said input of said converter, said second means alternately switching said electric power produced by said generator from the distribution bus to said input of said converter.

8. The system of claim 7, wherein said second means operates to ensure continuous power supply to the distribution bus.

9. The system of claim 7, wherein the system has at least two distribution buses, at least one of which is permanently connected to said generator.

10. The system of claim 1, wherein said first means comprises an electronic power converter having an input coupled to said generator's electrical output, and an output, and wherein said second means is interposed between said generator's electrical output and the distribution bus and between said output of said converter and the distribution bus, said second means alternately switching the distribution bus from said electrical output of said generator to said output of said converter.

11. The system of claim 10, wherein said second means operates to ensure continuous power supply to the distribution bus.

12. The system of claim 10, wherein the system has at least two distribution buses, at least one of which is permanently connected to said generator.

13. An electrical power generation and distribution system for use on aircraft, comprising:

a variable frequency generator coupled to an external aircraft engine, said generator producing electric power having a frequency related to a speed of the engine;

a first distribution bus coupled to said generator for distributing said electric power having a frequency related to a speed of the engine to external utilization equipment;

power converter means coupled to said generator for producing output electric power having a controlled frequency;

a second distribution bus coupled to said converter means; and a bi-directional switch assembly controllably coupling and decoupling said generator to and from said second distribution bus.

14. The system of claim 13, wherein said converter means monitors said electric power produced by said generator and controls said switch to decouple said generator from said second distribution bus upon sensing a deviation of said frequency outside a predetermined acceptable range.

15. The system of claim 13, wherein said converter means monitors said electric power produced by said generator and controls said frequency of its output electric power to match said frequency of said electric power produced by said generator, said converter means ensuring minimal power flow therefrom to said second distribution bus.

16. The system of claim 15, wherein said converter means controls said switch to decouple said generator from said second distribution bus upon sensing a deviation of said frequency outside a predetermined acceptable range, said converter means thereafter supplying electric power to said distribution bus, said electric power having a controlled frequency within said predetermined acceptable range.

17. The system of claim 16, wherein said converter means controls said switch to couple said generator to said second distribution bus upon sensing said frequency of said electric power produced by said generator within said predetermined acceptable range, said converter means thereafter supplying minimal electric power to said distribution bus.

18. An electric power generation and distribution system having a basic variable frequency distribution bus to which wide frequency variation tolerant utilization equipment is coupled and an enhanced frequency distribution bus to which wide frequency variation intolerant utilization equipment is coupled, comprising:

a variable speed generator driven by an external variable speed prime mover, said generator producing output electric power having a frequency which varies with a speed of said generator;

a converter electrically coupled to said generator for producing an output electric power having a controlled frequency;

means for coupling said generator to and decoupling said converter from said enhanced bus when said frequency of said electric power produced by said generator is within a predetermined acceptable range, and for decoupling said generator from and coupling said converter to said enhanced bus when said frequency of said electric power produced by said generator is outside said predetermined acceptable range.

19. The system of claim 18, wherein said basic bus is electrically coupled to said generator.

20. The system of claim 18, wherein said means ensures continuous power to said enhanced bus by momentarily paralleling said converter and said generator by coupling said generator prior to decoupling said converter and by coupling said converter prior to decoupling said generator.

* * * * *